June 5, 1928.
H. W. LORMOR
ACID DIPPER FOR STORAGE BATTERY PLATES
Filed Feb. 8, 1923 2 Sheets-Sheet 1
1,672,327
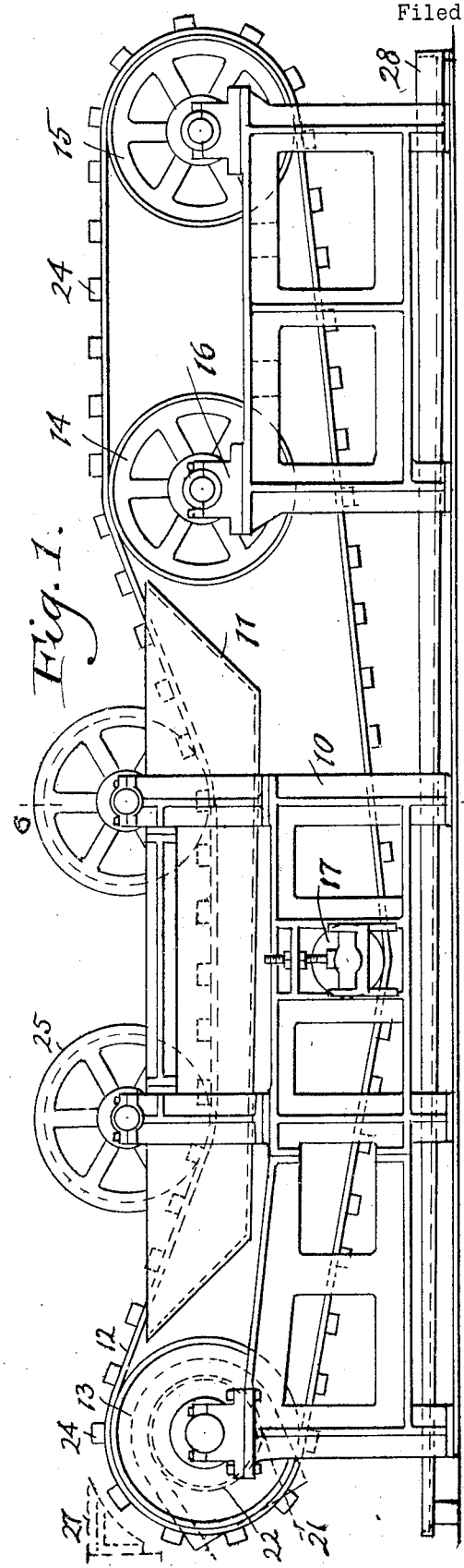
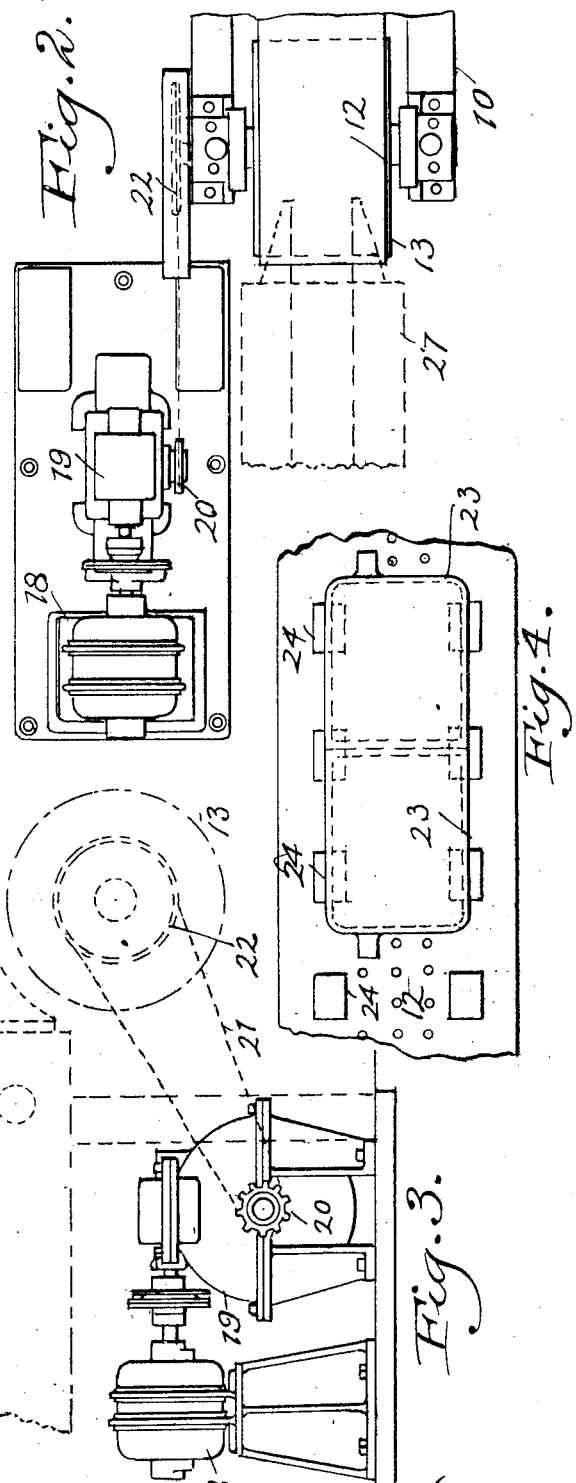

June 5, 1928. 1,672,327
H. W. LORMOR
ACID DIPPER FOR STORAGE BATTERY PLATES
Filed Feb. 8, 1923 2 Sheets-Sheet 2
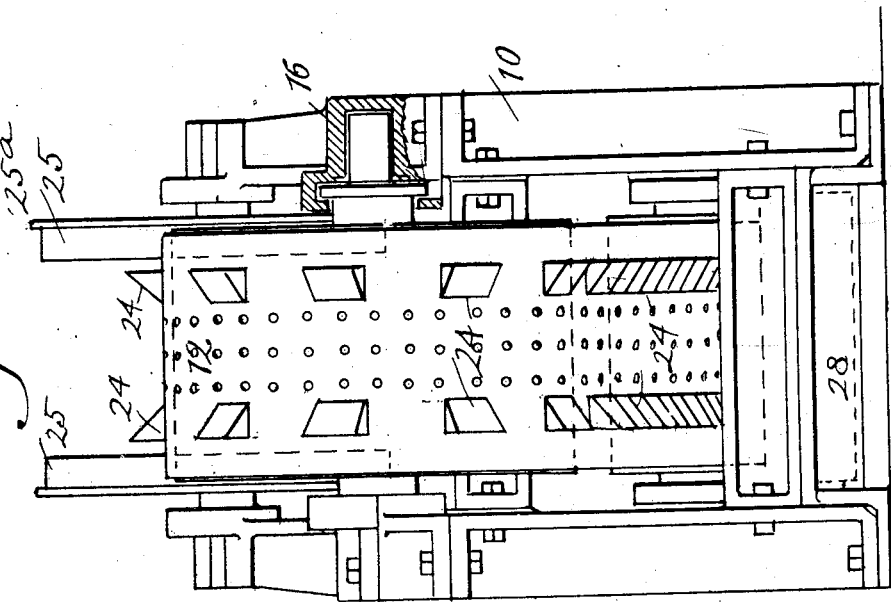
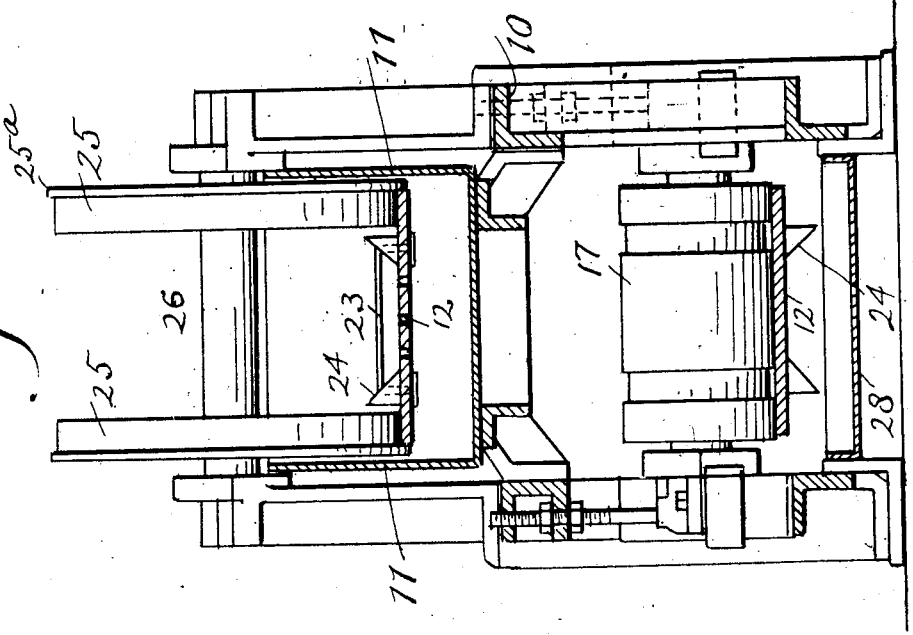
Inventor
Henry W. Lormor
Thurston Kwist Hudson
attys Patented June 5, 1928.

1,672,327

UNITED STATES PATENT OFFICE.

HENRY W. LORMOR, OF CLEVELAND, OHIO, ASSIGNOR TO WILLARD STORAGE BATTERY COMPANY, OF CLEVELAND, OHIO, A CORPORATION OF WEST VIRGINIA.

ACID DIPPER FOR STORAGE-BATTERY PLATES.

Application filed February 8, 1923. Serial No. 617,668.

This invention relates to a dipping machine and particularly to a so-called acid dipper by which storage battery plates are dipped into or run through acid preparatory to subsequent treatment to adapt them for storage battery use.

In the production of storage batteries the grids are pasted with active material and before being "formed" or subjected to the forming charge of electricity are immersed in an acid solution to harden the surface of the active material which when applied or placed in the grids is in a plastic state.

The present invention relates to a machine which is especially adapted for conveying the pasted grids or plates through an acid bath, and the object of the invention is to provide a machine with a conveyor so constructed and operated that the plates will be conveyed through the acid bath in a satisfactory manner and will be supported when on the conveyor solely at the outer rim and without, in fact, causing the supporting means to touch the active material.

The invention may be briefly summarized as consisting in certain novel details of construction and combinations and arrangements of parts which will be described in the specification and pointed out in the appended claims.

In the accompanying sheets of drawings wherein I have shown an embodiment of the invention which operates with high efficiency, Fig. 1 is a side elevation of the machine; Fig. 2 is a plan view of one end of the machine showing one way in which the conveyor may be driven; Fig. 3 is a view in side elevation showing particularly the driving means; Fig. 4 is a view of the conveyor belt showing the manner in which the plates are supported on the belt; Fig. 5 is a view looking toward one end of the machine; and Fig. 6 is a transverse sectional view substantially along the line 6—6 of Fig. 1.

The machine includes a frame 10, generally composed of several castings, on a portion of which frame there is supported a receptacle 11 for the acid. The plates are carried through the acid by a belt 12 which is preferably formed of rubber so as not to be affected by acid in the receptacle 11. This belt passes over three pulleys 13, 14 and 15 which are supported in bearings 16 mounted on suitable portions of the frame 10, the pulleys 13 and 14 being at opposite ends of the receptacle 11, and the belt being depressed between these pulleys, as will appear subsequently. The pulleys 13, 14 and 15 are all on the same level, and the belt is straight between the pulleys 14 and 15 so as to provide a horizontal delivery portion from which the plates may be removed by hand or otherwise. Beneath the receptacle there is an adjustable take-up pulley 17, supported in bearings near the bottom of the frame 10. The several pulleys so far referred to, namely, 13, 14, 15 and 17 may extend across the belt for its full width, as they engage the inner surface of the belt only, and will not interfere with the plate holding means.

It might be mentioned at this point that the pulley 13 is a driving pulley which may be driven in any suitable manner, a motor 18 being utilized in this case, connected by suitable reduction gearing in a case 19, this gearing driving a sprocket wheel 20 which is connected by a driving chain 21 to a sprocket wheel indicated at 22 on the shaft which supports the driving pulley 13. Other means may be provided, however, for driving the belt.

In Fig. 4 I have shown one of the plates which is carried through the acid in the receptacle 11, the plate being designated 23. Preferably double plates are carried through the acid bath as shown in Fig. 4, these plates being designed to be subsequently divided into halves so as to form two plates. The plate 23 is in the form of an elongated body consisting generally of an open frame-work of lead, which is filled with the paste, there being around the outside a narrow rim of lead. In supporting the plates on the belt it is important that the supporting means contact the outer rim only, and that this may be done, the belt 12 is provided throughout its length and at regularly spaced intervals with V-shaped plate holding blocks or lugs 24, the inner faces of the holders being tapered in order that the plate may be supported on pairs of these blocks in the manner indicated in Figs. 4 and 6 without danger of the holders engaging anything but the rim of the plate. When double plates are fed through the machine, each plate is preferably supported on three pairs of the holders 24 when the plates are traveling along a horizontal portion of the belt, and at points where the belt is deflected there will always be two pairs of the holders to support the plate.

In order that the plates may be carried through the receptacle 11, a portion of the belt is depressed in the receptacle but it is obvious that the depressing means must not interfere with the plates 23 and the plate holders 24. To accomplish this in a satisfactory manner, depressing pulleys 25 are employed. These pulleys 25 are arranged in pairs, each mounted on a shaft 26, supported in the upper part of the frame 10 immediately above the receptacle 11. Each pair of pulleys 25 projects down into this receptacle in a manner clearly indicated in Fig. 1, and these pulleys are relatively narrow and engage simply the outer marginal portions of the belt, the spacing of the pulleys of each pair being such that the plates 23 and holders 24 will pass between them, as indicated in Fig. 6. Preferably these pulleys are provided with guide flanges 25ª which engage the outer edges of the belt and thus guide the belt and cause the depressed portion to pass properly through the receptacle. The plates are delivered onto the belt from a suitable table, a portion of which is indicated at 27 in Figs. 1, 2 and 3, and along which the plates may be fed in any suitable manner, this part of the apparatus constituting no part of the present invention. They pass from the table 27 directly onto the holders 24 of the belt, and are then carried downwardly into the receptacle, then laterally across it, and then upwardly out of the receptacle and along the horizontal portion of the belt supported by the pulleys 14 and 15. The plates are delivered from, or taken from the belt in any suitable way, either by hand or automatically. The speed of the belt is such that each plate from the time it enters the acid at one end of the receptacle until it leaves the acid at the opposite end will be submerged just the necessary length of time to produce the desired hardening results on the active material.

Thus it will be seen that the plates are engaged by the holders of the belt at the outer edges of the plates only, and notwithstanding the fact that these holders are on the outer surface of the belt and that the plates lie over the outer surface, nevertheless, the belt is depressed and carried through the acid receptacle without disturbing the plates or engaging the plate holders.

To taken care of the drippage from the plates as they are carried out of the acid bath by the belt, the latter is provided throughout its length with perforations 12ª, the belt which I have used in practice being provided with three rows of perforations, with the perforations of each row spaced fairly close together, and to catch the acid which drips from the plates and through the belt, the machine is provided at the bottom with a drip pan 28 which extends lengthwise of the machine for the full length of the belt. This drip pan is inclined as shown in Fig. 1, so that the acid can be withdrawn from one end.

In order that the machine will not be attacked by the acid, all castings and practically all the parts are made of antimony lead, and such parts as cannot be made of this material, such as bolts and nuts, are thoroughly lead coated so as to be acid resistant. Inasmuch as the belt is made of rubber and all the metal parts of acid resistant material, the fact that the machine is used in connection with an acid, which in the case of storage battery plates is sulphuric acid, does not in any way effect its life. It might be stated in conclusion that the straight section of the belt at the right hand end of the machine as shown in Fig. 1, is provided in order that the acid on the plates may drip therefrom before the plates are removed from the belt, this section being termed the dripping section.

Having described my invention, I claim:

1. In a machine of the character described, a receptacle, an endless conveyor for carrying storage battery plates through the receptacle, plate holders projecting from the outer surface of the conveyor, pulleys engaging the inner surface of the conveyor to support it, and depressors arranged over the receptacle and engaging the outer surface of the conveyor outside of the plate holders so as to depress a portion of the conveyor into the receptacle.

2. In a dipper of the character described, a receptacle, an endless belt for conveying storage battery plates through the receptacle and provided at regular intervals with plate holders projecting from the outer surface thereof, supporting pulleys about which the belt passes, and depressing pulleys projecting into the receptacle and engaging the marginal portions of the belt outside the plate holders.

3. In a machine of the character described, an endless belt for supporting and conveying storage battery plates, said belt being provided with plate holders arranged in pairs at regular intervals along the belt and having plate engaging tapered surfaces, supporting pulleys engaging the inner surface of the belt, a receptacle through which the plates are adapted to be carried by the belt, and depressing pulleys engaging the outer surface of the belt outside of the plate holders and projecting into the receptacle.

In testimony whereof, I hereunto affix my signature.

HENRY W. LORMOR